(12) United States Patent
Park et al.

(10) Patent No.: US 12,495,682 B2
(45) Date of Patent: Dec. 9, 2025

(54) TOUCH DISPLAY DEVICE

(71) Applicant: LG Display Co., Ltd., Seoul (KR)

(72) Inventors: Heonkwang Park, Gyeonggi-do (KR); Jiyoon Shin, Gyeonggi-do (KR)

(73) Assignee: LG Display Co., Ltd (KR)

( * ) Notice: Subject to any disclaimer, the term of this patent is extended or adjusted under 35 U.S.C. 154(b) by 485 days.

(21) Appl. No.: 17/960,361

(22) Filed: Oct. 5, 2022

(65) Prior Publication Data
US 2023/0189573 A1    Jun. 15, 2023

(30) Foreign Application Priority Data

Dec. 13, 2021   (KR) ........................ 10-2021-0177294

(51) Int. Cl.
| | | |
|---|---|---|
| *H10K 59/122* | (2023.01) | |
| *G06F 3/041* | (2006.01) | |
| *G06F 3/044* | (2006.01) | |
| *H10K 59/40* | (2023.01) | |
| *H10K 59/80* | (2023.01) | |

(52) U.S. Cl.
CPC ........ *H10K 59/122* (2023.02); *G06F 3/0412* (2013.01); *G06F 3/0443* (2019.05); *H10K 59/873* (2023.02); *G06F 3/0416* (2013.01); *G06F 2203/04103* (2013.01); *G06F 2203/04111* (2013.01); *H10K 59/40* (2023.02)

(58) Field of Classification Search
CPC .... H10K 59/122; H10K 50/844; H10K 59/40; H10K 59/873; H10K 50/865; G06F 3/0412; G06F 3/0443; G06F 3/0416; G06F 2203/04103; G06F 2203/04111; G06F 3/0446
See application file for complete search history.

(56) References Cited

U.S. PATENT DOCUMENTS

| | | | | |
|---|---|---|---|---|
| 2021/0026513 A1* | 1/2021 | Lee | ....................... | G06F 3/0445 |
| 2021/0200360 A1* | 7/2021 | Lee | ....................... | G06F 3/0443 |
| 2021/0202672 A1* | 7/2021 | Kim | ..................... | G06F 3/04164 |

FOREIGN PATENT DOCUMENTS

| | | |
|---|---|---|
| KR | 20200113108 A | 10/2020 |
| KR | 20210011213 A | 2/2021 |
| KR | 20210086143 A | 7/2021 |

OTHER PUBLICATIONS

Office Action in Korean Appln. No. 10-2021-0177294, mailed on Aug. 25, 2025, 14 pages (with English translation).

* cited by examiner

*Primary Examiner* — Mohammad A Rahman
(74) *Attorney, Agent, or Firm* — Fish & Richardson P.C.

(57) ABSTRACT

A touch display device with enhanced display quality at the boundary between the display area and the non-display area includes a substrate, a subpixel including a transistor positioned on the substrate and a light emitting element electrically connected with the transistor, an encapsulation layer positioned to cover the light emitting element, a touch sensor positioned on the encapsulation layer, a planarization layer positioned on the touch sensor, and at least one dam structure configured to prevent overflow of the planarization layer.

20 Claims, 9 Drawing Sheets

TOUCH DISPLAY DEVICE

CROSS-REFERENCE TO RELATED APPLICATION

This application claims the priority of Korean Patent Application No. 10-2021-0177294, filed on Dec. 13, 2021, which is hereby incorporated by reference in its entirety.

BACKGROUND

Field of the Disclosure

The present disclosure relates to a touch display device.

Description of the Background

The growth of the intelligent society leads to increased demand for image display devices and use of various types of display devices, such as liquid crystal displays, organic light emitting displays, etc.

The display device may have a polarizing plate disposed on the entire surface of the substrate where the subpixels are disposed to prevent deterioration of display quality due to contact of the reflection of incident light to the user's eyes.

If a portion of the polarizing plate is insufficiently supported from thereunder near the boundary between the display area where the subpixels are positioned and the non-display area where no subpixels are positioned, the polarizing plate may be bent, causing display defects to be noticeable to the user.

SUMMARY

Accordingly, the present disclosure is to provide a touch display device with enhanced display quality at the boundary between the display area and the non-display area.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, a touch display device includes a substrate, a subpixel including a transistor positioned on the substrate and a light emitting element electrically connected with the transistor, an encapsulation layer positioned to cover the light emitting element, a touch sensor positioned on the encapsulation layer, a planarization layer positioned on the touch sensor, and at least one dam structure configured to prevent overflow of the planarization layer.

In another aspect of the present disclosure, a touch display device includes a substrate including a display area and a non-display area having a bezel area, a bending area and a pad area that are disposed outside the display area, a subpixel disposed on the substrate, a planarization layer disposed on the subpixel, a touch sensor disposed on the planarization layer, an encapsulation layer disposed on the touch sensor, and a first dam structure disposed in the non-display area in a close proximity to the display area where the planarization layer is removed.

According to various aspects of the disclosure, a touch display device with enhanced display quality at the boundary between the display area and the non-display area can be provided.

It is to be understood that both the foregoing general description and the following detailed description are exemplary and explanatory and are intended to provide further explanation of the disclosure as claimed.

BRIEF DESCRIPTION OF THE DRAWINGS

The above and other features and advantages of the disclosure will be more clearly understood from the following detailed description, taken in conjunction with the accompanying drawings, in which.

DETAILED DESCRIPTION

Figure 1:
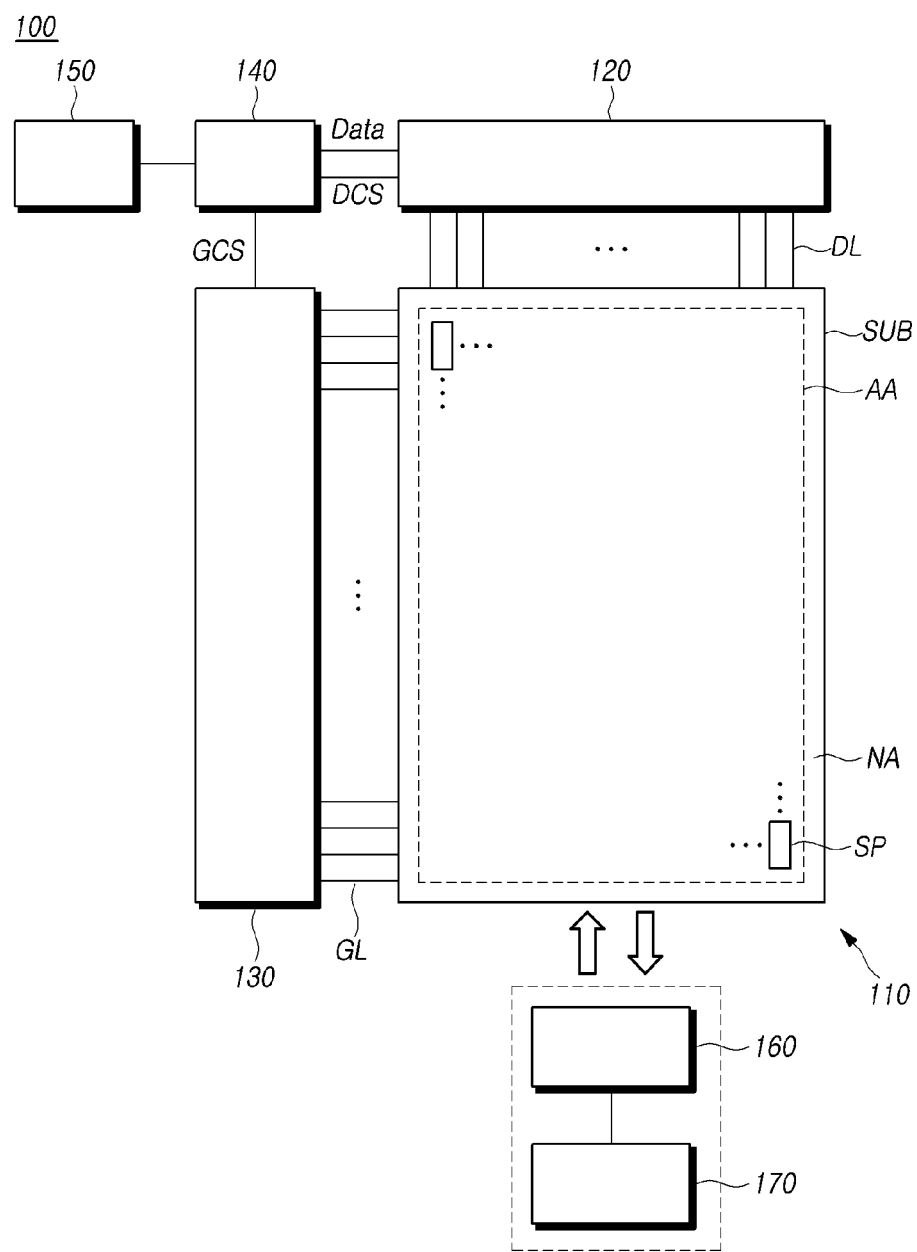
FIG. 1 is a view illustrating a system configuration of a touch display device according to the present disclosure.

In the following description of examples or aspects of the disclosure, reference will be made to the accompanying drawings in which it is shown by way of illustration specific examples or aspects that can be implemented, and in which the same reference numerals and signs can be used to designate the same or like components even when they are shown in different accompanying drawings from one another. Further, in the following description of examples or aspects of the disclosure, detailed descriptions of well-known functions and components incorporated herein will be omitted when it is determined that the description may make the subject matter in some aspects of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various aspects of the disclosure are described in detail with reference to the accompanying drawings.

FIG. 1 is a view illustrating a system configuration of a touch display device 100 according to aspects of the disclosure.

Referring to FIG. 1, the touch display device 100 may include a display panel 110 and a display driving circuit as components for displaying an image.

The display driving circuits are circuits for driving the display panel 110 and may include a data driving circuit 120, a gate driving circuit 130, and a display controller 140.

The display panel 110 may include a display area AA in which images are displayed and a non-display area NA in which no image is displayed. The non-display area NA may be an outer area of the display area AA and be referred to as a bezel area. The whole or part of the non-display area NA may be an area visible from the front surface of the touch display device 100 or an area that is bent and not visible from the front surface of the touch display device 100.

The display panel 110 may include a substrate SUB and a plurality of subpixels SP disposed on the substrate SUB. The display panel 110 may further include various types of signal lines to drive the plurality of subpixels SP.

The touch display device 100 according to aspects of the disclosure may be a liquid crystal display device or a light emission display device in which the display panel 110 emits light by itself. When the touch display device 100 according to the aspects of the disclosure is a self-emission display device, each of the plurality of subpixels SP may include a light emitting element.

For example, the touch display device 100 according to aspects of the disclosure may be an organic light emitting diode display in which the light emitting element is implemented as an organic light emitting diode (OLED). As another example, the touch display device 100 according to aspects of the disclosure may be an inorganic light emitting display device in which the light emitting element is implemented as an inorganic material-based light emitting diode. As another example, the touch display device 100 according to aspects of the disclosure may be a quantum dot display device in which the light emitting element is implemented as a quantum dot which is self-emission semiconductor crystal.

The structure of each of the plurality of subpixels SP may vary according to the type of the touch display device 100. For example, when the touch display device 100 is a self-emission display device in which the subpixels SP emit light by themselves, each subpixel SP may include a light emitting element that emits light by itself, one or more transistors, and one or more capacitors.

For example, various types of signal lines may include a plurality of data lines DL transferring data signals (also referred to as data voltages or image signals) and a plurality of gate lines GL transferring gate signals (also referred to as scan signals).

The plurality of data lines DL and the plurality of gate lines GL may cross each other. Each of the plurality of data lines DL may be disposed as extending in a first direction. Each of the plurality of gate lines GL may be disposed as extending in a second direction.

Here, the first direction may be a column direction and the second direction may be a row direction. Conversely, the first direction may be the row direction, and the second direction may be the column direction.

The data driving circuit 120 is a circuit configured to drive the plurality of data lines DL, and may output data signals to the plurality of data lines DL. The gate driving circuit 130 is a circuit configured to drive the plurality of gate lines GL, and may output gate signals to the plurality of gate lines GL.

The display controller 140 may be a device configured to control the operation of the data driving circuit 120 and the gate driving circuit 130. The display controller 140 may control driving timings for the plurality of data lines DL and driving timings for the plurality of gate lines GL.

The display controller 140 may supply the data driving control signal DCS to the data driving circuit 120 to control the data driving circuit 120. The display controller 140 may supply the gate driving circuit control signal GCS to the gate driving circuit 130 to control the gate driving circuit 130.

The display controller 140 may receive input image data from the host system 150 and supply image data Data to the data driving circuit 120 based on the input image data.

The data driving circuit 120 may supply data signals to the plurality of data lines DL according to the driving timings of the display controller 140.

The data driving circuit 120 may receive digital image data Data from the display controller 140 and may convert the received image data Data into analog data signals and output them to the plurality of data lines DL.

The gate driving circuit 130 may supply gate signals to the plurality of gate lines GL according to the driving timings of the display controller 140. The gate driving circuit 130 may receive a first gate voltage corresponding to a turn-on level voltage and a second gate voltage corresponding to a turn-off level voltage, along with various gate driving circuit control signals GCS, generate gate signals, and supply the generated gate signals to the plurality of gate lines GL.

For example, the data driving circuit 120 may be connected with the display panel 110 by a tape automated bonding (TAB) method or connected to a bonding pad of the display panel 110 by a chip on glass (COG) or chip on panel (COP) method or may be implemented by a chip on film (COF) method and connected with the display panel 110.

The gate driving circuit 130 may be connected with the display panel 110 by a tape automated bonding (TAB) method or connected to a bonding pad of the self-emission display panel 110 by a COG or chip on panel (COP) method or may be connected with the display panel 110 according to a COF method. The gate driving circuit 130 may be formed in a gate in panel (GIP) type, in the non-display area NA of the display panel 110. The gate driving circuit 130 may be disposed on the substrate SUB or may be connected to the substrate SUB. In other words, the gate driving circuit 130 that is of a gate in panel (GIP) type may be disposed in the non-display area NA of the substrate SUB. The gate driving circuit 130 that is of a chip-on-glass (COG) type or chip-on-film (COF) type may be connected to the substrate.

Meanwhile, at least one of the data driving circuit 120 and the gate driving circuit 130 may be disposed in the display area AA of the display panel 110. For example, at least one of the data driving circuit 120 and the gate driving circuit 130 may be disposed not to overlap with the subpixels SP or to overlap with all or some of the subpixels SP.

The data driving circuit 120 may be connected with one side (e.g., an upper or lower side) of the display panel 110. Depending on the driving scheme or the panel design scheme, the data driving circuit 120 may be connected with both sides (e.g., upper and lower sides) of the self-emission display panel 110, or two or more of the four sides of the self-emission display panel 110.

The gate driving circuit 130 may be connected with one side (e.g., a left or right side) of the display panel 110. Depending on the driving scheme or the panel design scheme, the gate driving circuit 130 may be connected with both sides (e.g., left and right sides) of the display panel 110, or two or more of the four sides of the display panel 110.

The display controller 140 may be implemented as a separate component from the data driving circuit 120, or the display controller 140 and the data driving circuit 120 may be integrated into an integrated circuit (IC).

The display controller 140 may be a timing controller used in typical display technology, a control device that may perform other control functions as well as the functions of the timing controller, or a control device other than the timing controller, or may be a circuit in the control device. The display controller 140 may be implemented as various circuits or electronic components, such as an integrated circuit (IC), a field programmable gate array (FPGA), an application specific integrated circuit (ASIC), or a processor.

The display controller 140 may be electrically connected to the data driving circuit 120 and the gate driving circuit 130 through a printed circuit board (PCB) or a flexible printed circuit board (FPCB).

The display controller 140 may transmit/receive signals to/from the data driving circuit 120 according to one or more predetermined interfaces. The interface may include, e.g., a low voltage differential signaling (LVDS) interface, an EPI interface, and a serial peripheral interface (SPI).

To provide a touch sensing function as well as an image display function, the touch display device 100 according to aspects of the disclosure may include a touch sensor and a touch sensing circuit that senses the touch sensor to detect whether a touch occurs by a touch object, such as a finger or pen, or the position of the touch.

The touch sensing circuit may include a touch driving circuit 160 that drives and senses the touch sensor and generates and outputs touch sensing data and a touch controller 170 that may detect an occurrence of a touch or the position of the touch using touch sensing data.

The touch sensor may include a plurality of touch electrodes. The touch sensor may further include a plurality of touch lines for electrically connecting the plurality of touch electrodes and the touch driving circuit 160.

The touch sensor in the form of a touch panel may exist outside the display panel 110, or the touch sensor may exist inside the display panel 110.

When the touch panel, in the form of a panel, exists outside the display panel 110, the touch panel is referred to as an external type. When the touch sensor is of the external type, the touch panel and the display panel 110 may be separately manufactured or may be combined during an assembly process. The external-type touch panel may include a touch panel substrate and a plurality of touch electrodes on the touch panel substrate.

When the touch sensor is present inside the display panel 110, the touch sensor may be formed on the substrate SUB, together with signal lines and electrodes related to display driving, during the manufacturing process of the display panel 110.

The touch driving circuit 160 may supply a touch driving signal to at least one of the plurality of touch electrodes and may sense at least one of the plurality of touch electrodes to generate touch sensing data.

The touch sensing circuit may perform touch sensing in a self-capacitance sensing scheme or a mutual-capacitance sensing scheme.

When the touch sensing circuit performs touch sensing in the self-capacitance sensing scheme, the touch sensing circuit may perform touch sensing based on capacitance between each touch electrode and the touch object (e.g., finger or pen).

According to the self-capacitance sensing scheme, each of the plurality of touch electrodes may serve both as a driving touch electrode and as a sensing touch electrode. The touch driving circuit 160 may drive all or some of the plurality of touch electrodes and sense all or some of the plurality of touch electrodes.

When the touch sensing circuit performs touch sensing in the mutual-capacitance sensing scheme, the touch sensing circuit may perform touch sensing based on capacitance between the touch electrodes.

According to the mutual-capacitance sensing scheme, the plurality of touch electrodes are divided into driving touch electrodes and sensing touch electrodes. The touch driving circuit 160 may drive the driving touch electrodes and sense the sensing touch electrodes.

The touch driving circuit 160 and the touch controller 170 included in the touch sensing circuit may be implemented as separate devices or as a single device. The touch driving circuit 160 and the data driving circuit 120 may be implemented as separate devices or as a single device.

The touch display device 100 may further include a power supply circuit for supplying various types of power to the display driver integrated circuit and/or the touch sensing circuit.

The touch display device 100 according to aspects of the disclosure may be a mobile terminal, such as a smart phone or a tablet, or a monitor or television (TV) in various sizes but, without limited thereto, may be a display device in various types and various sizes capable of displaying information or images.

Figure 2:
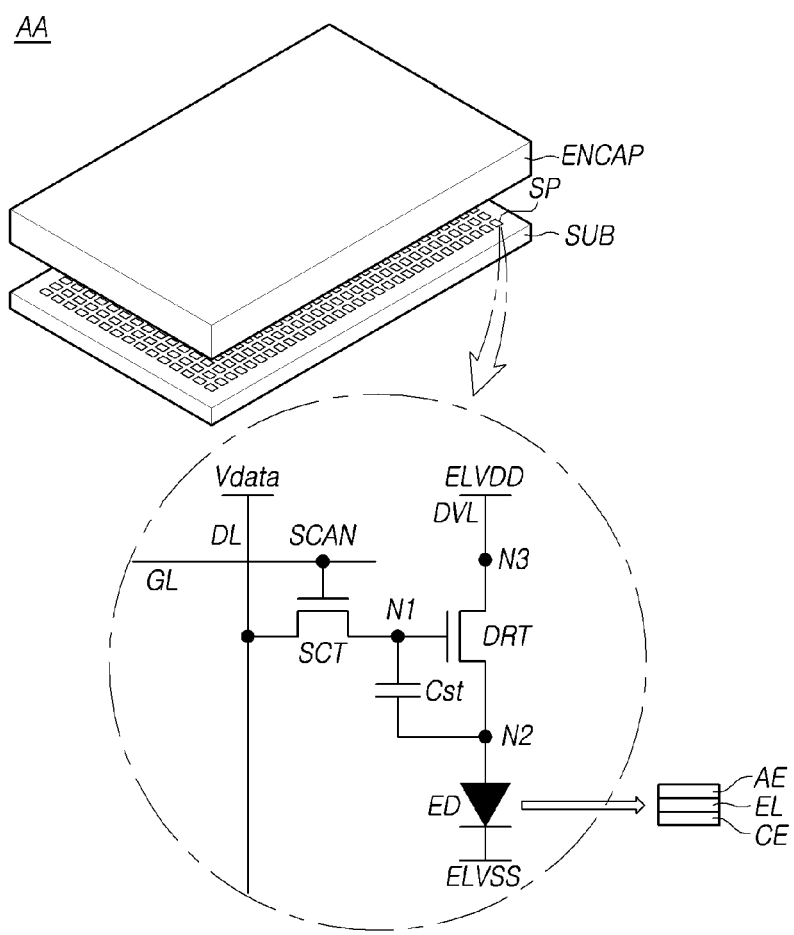
FIG. 2 is a view illustrating an equivalent circuit of a subpixel in a display panel according to the present disclosure.

FIG. 2 is an equivalent circuit of a subpixel SP in a display panel 110 according to aspects of the disclosure.

Referring to FIG. 2, each subpixel SP in the display area AA of the display panel 110 may include a light emitting element ED, a driving transistor DRT for driving the light emitting element ED, a scan transistor SCT for transferring a data voltage Vdata to a first node N1 of the driving transistor DRT, and a storage capacitor Cst for maintaining a constant voltage during one frame.

The driving transistor DRT may include the first node N1 to which the data voltage Vdata may be applied, a second node N2 electrically connected with the light emitting element ED, and a third node N3 to which a high-potential common voltage ELVDD is applied from a driving voltage line DVL. The first node N1 in the driving transistor DRT may be a gate node, the second node N2 may be either a source node or a drain node, and the third node N3 may be the other of the source node and the drain node.

The light emitting element ED may include an anode electrode AE, a light emitting layer EL, and a cathode electrode CE. The anode electrode AE may be a pixel electrode disposed in each subpixel SP and be electrically connected to the second node N2 of the driving transistor DRT of each subpixel SP. The cathode electrode CE may be a common electrode commonly disposed in the plurality of subpixels SP, and a low-potential common voltage ELVSS may be applied thereto.

For example, the anode electrode AE may be a pixel electrode, and the cathode electrode CE may be a common electrode. Conversely, the anode electrode AE may be a common electrode, and the cathode electrode CE may be a pixel electrode. Hereinafter, for convenience of description, it is assumed that the anode electrode AE is a pixel electrode and the cathode electrode CE is a common electrode.

For example, the light emitting element ED may be an organic light emitting diode (OLED), an inorganic light emitting diode, or a quantum dot light emitting element. In this case, when the light emitting element ED is an organic light emitting diode, the light emitting layer EL of the light emitting element ED may include an organic light emitting layer including an organic material.

The on/off of the scan transistor SCT is controlled by the scan signal SCAN, which is a gate signal applied through the gate line GL. The scan transistor SCT may switch the electrical connection between the data line DL and the first node N1 of the driving transistor DRT.

The storage capacitor Cst may be electrically connected between the first node N1 and second node N2 of the driving transistor DRT.

Each subpixel SP may have a 2T (transistor)1C (capacitor) structure which includes two transistors DRT and SCT and one capacitor Cst as shown in FIG. 2 and, in some cases, each subpixel SP may further include one or more transistors or one or more capacitors.

The capacitor Cst may be an external capacitor intentionally designed to be outside the driving transistor DRT, but not a parasite capacitor (e.g., Cgs or Cgd) which is an internal capacitor that may be present between the first node N1 and the second node N2 of the driving transistor DRT.

Each of the driving transistor DRT and the scan transistor SCT may be an n-type transistor or a p-type transistor.

Since the circuit elements (particularly, the light emitting element ED) in each subpixel SP are vulnerable to external moisture or oxygen, an encapsulation layer ENCAP may be disposed on the display panel 110 to prevent penetration of external moisture or oxygen into the circuit elements (particularly, the light emitting element ED). The encapsulation layer ENCAP may be disposed to cover the light emitting elements ED.

Figure 3:
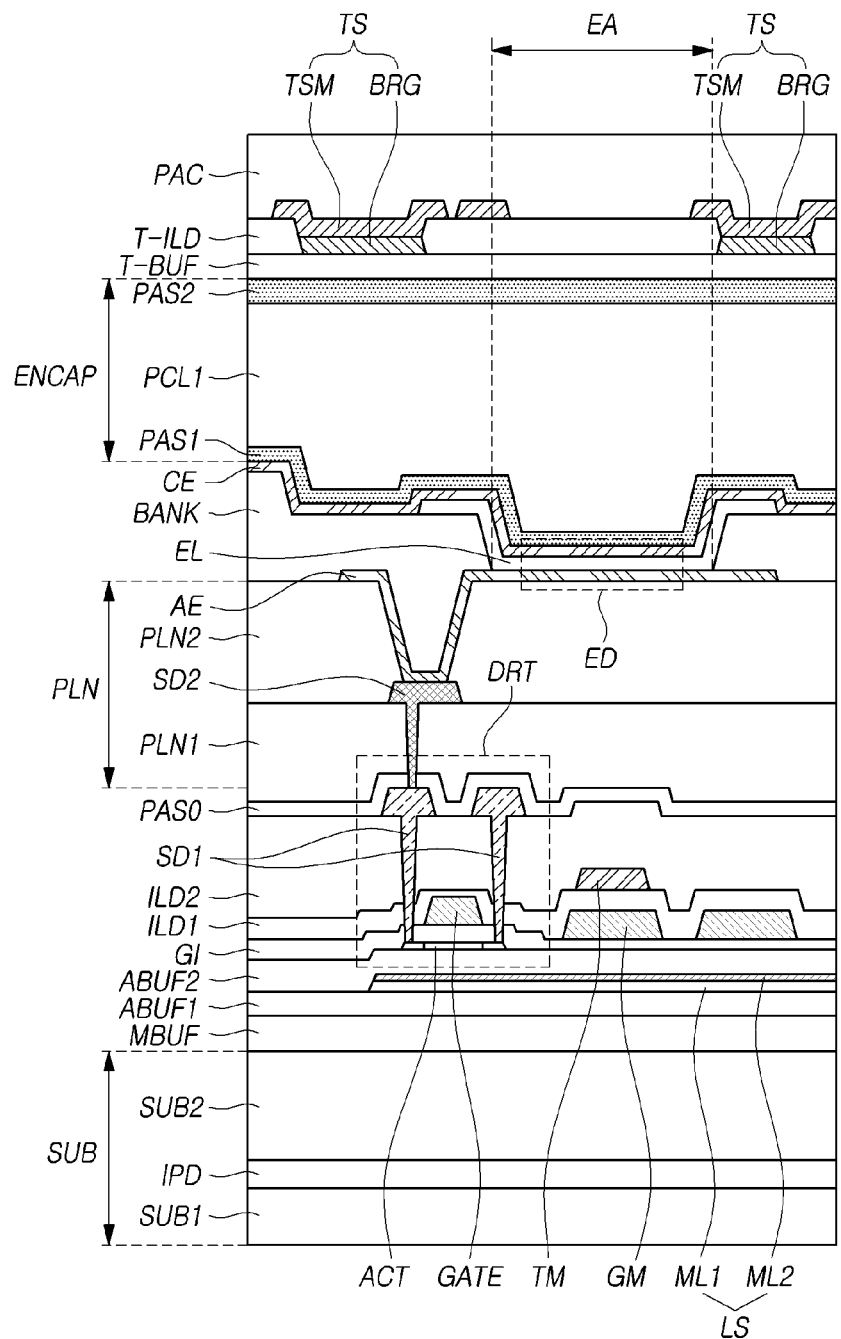
FIG. 3 is a cross-sectional view illustrating a display area of a display panel according to the present disclosure.

FIG. 3 is a cross-sectional view illustrating a display area AA of a display panel 110 according to aspects of the disclosure.

Referring to FIG. 3, the substrate SUB may include a first substrate SUB1, an inter-layer insulation film IPD, and a second substrate SUB2. The inter-layer insulation film IPD may be positioned between the first substrate SUB1 and the second substrate SUB2. By configuring the substrate SUB with the first substrate SUB1, the inter-layer insulation film IPD and the second substrate SUB2, it is possible to prevent moisture penetration. For example, the first substrate SUB1 and the second substrate SUB2 may be polyimide (PI) substrates. The first substrate SUB1 may be referred to as a primary PI substrate, and the second substrate SUB2 may be referred to as a secondary PI substrate.

Referring to FIG. 3, on the substrate SUB, various patterns, e.g., various patterns ACT, SD1, and GATE for forming a transistor, such as a driving transistor DRT, various insulation films MBUF, ABUF1, ABUF2, GI, ILD1, ILD2, and PAS0, and various metal patterns TM, GM, ML1, and ML2 may be positioned.

Referring to FIG. 3, a multi-buffer layer MBUF may be disposed on the second substrate SUB2. A first active buffer layer ABUF1 may be disposed on the multi-buffer layer MBUF.

A first metal layer ML1 and a second metal layer ML2 may be disposed on the first active buffer layer ABUF1. The first metal layer ML1 and the second metal layer ML2 may be a light shield layer LS for shielding light.

A second active buffer layer ABUF2 may be disposed on the first metal layer ML1 and the second metal layer ML2.

A gate insulation film GI may be disposed as covering the active layer ACT.

A gate electrode GATE of the driving transistor DRT may be disposed on the gate insulation film GI.

The first inter-layer insulation film ILD1 may be disposed as covering the gate electrode GATE and the gate material layer GM. A metal pattern TM may be disposed on the first inter-layer insulation film ILD1. The metal pattern TM may be located in a position different from the position where the driving transistor DRT is formed. The second inter-layer insulation film ILD2 may be disposed as covering the metal pattern TM on the first inter-layer insulation film ILD1.

Two first source-drain electrode material patterns SD1 may be disposed on the second inter-layer insulation film ILD2. One of the two first source-drain electrode material patterns SD1 is the source node of the driving transistor DRT, and the other is the drain node of the driving transistor DRT.

The two first source-drain electrode material patterns SD1 may be electrically connected with the two opposite sides of the active layer ACT through the contact hole of the second inter-layer insulation film ILD2, the first inter-layer insulation film ILD1, and the gate insulation film GI.

A portion of the active layer ACT overlapping with the gate electrode GATE is a channel area. One of the two first source-drain electrode material patterns SD1 may be connected to one side of the channel area in the active layer ACT, and the other one of the two first source-drain electrode material patterns SD1 may be connected to the other side of the channel area in the active layer ACT.

A passivation layer PAS0 is disposed as covering the two first source-drain electrode material patterns SD1. A planarization layer PLN may be disposed on the passivation layer PAS0. The planarization layer PLN may include a first planarization layer PLN1 and a second planarization layer PLN2. The planarization layer PLN may be an organic insulation film layer capable of performing a planarization function.

The first planarization layer PLN1 may be disposed on the passivation layer PAS0.

A second source-drain electrode material pattern SD2 may be disposed on the first planarization layer PLN1. The second source-drain electrode material pattern SD2 may be connected with one of the two first source-drain electrode material patterns SD1 (corresponding to the second node N2 of the driving transistor DRT in the subpixel SP of FIG. 2) through the contact hole of the first planarization layer PLN1.

The second planarization layer PLN2 may be disposed as covering the second source-drain electrode material pattern SD2. A light emitting element ED may be disposed on the second planarization layer PLN2.

In the stacked structure of the light emitting element ED, the anode electrode AE may be disposed on the second planarization layer PLN2. The anode electrode AE may be electrically connected to the second source-drain electrode material pattern SD2 through the contact hole of the second planarization layer PLN2.

The bank BANK may be disposed as covering a portion of the anode electrode AE. A portion of the bank BANK corresponding to the light emitting area EA of the subpixel SP may be opened.

A portion of the anode electrode AE may be exposed through an opening (open portion) of the bank BANK. A light emitting layer EL may be positioned on a side surface of the bank BANK and the opening (open portion) of the bank BANK. The whole or part of the light emitting layer EL may be positioned between adjacent banks BANK.

In the opening of the bank BANK, the light emitting layer EL may contact the anode electrode AE. A cathode electrode CE may be disposed on the light emitting layer EL.

The light emitting element ED may be formed by the anode electrode AE, the light emitting layer EL, and the cathode electrode CE. The light emitting layer EL may include an organic film.

An encapsulation layer ENCAP may be disposed on the above-described light emitting element ED.

The encapsulation layer ENCAP may have a single-layer structure or a multi-layer structure. For example, as illustrated in FIG. 3, the encapsulation layer ENCAP may include a first passivation layer PAS1, a first encapsulation layer PCL1, and a second encapsulation layer PAS2.

For example, the first passivation layer PAS1 and the second passivation layer PAS2 may be inorganic films, and the first encapsulation layer PCL1 may be an organic layer. Among the first passivation layer PAS1, the first encapsulation layer PCL1, and the second passivation layer PAS2, the first encapsulation layer PCL1 which is an organic film may be the thickest and play a role as a planarization layer.

The first passivation layer PAS1 may be disposed on the cathode electrode CE and be disposed closest to the light emitting element ED. The first passivation layer PAS1 may be formed of an inorganic insulating material capable of low-temperature deposition. For example, the first passivation layer PAS1 may be formed of silicon nitride (SiNx), silicon oxide (SiOx), silicon oxynitride (SiON), or aluminum oxide (Al2O3). Since the first passivation layer PAS1 is deposited in a low temperature atmosphere, the first encapsulation layer PAS1 may prevent damage to the light emitting layer EL including an organic material vulnerable to a high temperature atmosphere during the deposition process.

The first encapsulation layer PCL1 may have a smaller area than the first passivation layer PAS1. In this case, the first encapsulation layer PCL1 may be formed to expose two opposite ends of the first passivation layer PAS1. The first encapsulation layer PCL1 serves as a buffer for relieving stress between layers due to bending of the display device 100 and may also serve to enhance planarization performance. For example, the first encapsulation layer PCL1 may be an acrylic resin, an epoxy resin, polyimide, polyethylene, or silicon oxycarbide (SiOC) and be formed of an organic insulating material. For example, the first encapsulation layer PCL1 may be formed through inkjet printing. The first encapsulation layer PCL1 is also referred to as a particle cover layer (PCL), and has an excellent planarization performance. Accordingly, the first encapsulation layer PCL1 may compensate for the step of the lower layer and is suitable for providing a planarization performance.

The second passivation layer PAS2 may be formed on the substrate SUB, where the first encapsulation layer PCL1 is formed, to cover the respective upper surfaces and side surfaces of the first encapsulation layer PCL1 and the first inorganic passivation layer PAS1. The second passivation layer PAS2 may minimize or block external moisture or oxygen from penetrating into the first passivation layer PAS1 and the first encapsulation layer PCL1. For example, the second passivation layer PAS2 may be formed of an inorganic insulating material, such as silicon nitride (SiNx), silicon oxide (SiOx), silicon oxynitride (SiON), or aluminum oxide (Al2O3).

A touch sensor TS may be disposed on the encapsulation layer ENCAP. The structure of the touch sensor TS is described below in detail.

A touch buffer film T-BUF may be disposed on the encapsulation layer ENCAP. A touch sensor TS may be disposed on the touch buffer film T-BUF.

The touch sensor TS may include a touch sensor metal TSM and a bridge metal BRG positioned on different layers.

A touch inter-layer insulation film T-ILD may be disposed between the touch sensor metal TSM and the bridge metal BRG.

For example, the touch sensor metals TSM may include a first touch sensor metal TSM, a second touch sensor metal TSM, and a third touch sensor metal TSM that are disposed adjacent to each other. The third touch sensor metal TSM is disposed between the first touch sensor metal TSM and the second touch sensor metal TSM and, when the first touch sensor metal TSM and the second touch sensor metal TSM are electrically connected to each other, the first touch sensor metal TSM and the second touch sensor metal TSM may be electrically connected to each other through the bridge metal BRG positioned on a different layer. The bridge metal BRG may be insulated from the third touch sensor metal TSM by the touch inter-layer insulation film T-ILD.

When the touch sensor TS is formed on the display panel 110, the chemical solution (e.g., developer or etchant) used in the process may be introduced or moisture may flow in from the outside. By disposing the touch sensor TS on the touch buffer film T-BUF, it is possible to prevent a chemical solution or moisture from penetrating into the light emitting layer EL including an organic material during the manufacturing process of the touch sensor TS. Thus, the touch buffer film T-BUF may prevent damage to the light emitting layer EL vulnerable to chemicals or moisture.

The touch buffer film T-BUF may be formed of an organic insulation material with a low permittivity of 1 to 3 and formed at a low temperature which is not more than a predetermined temperature (e.g., 100° C.) to prevent damage to the light emitting layer EL containing the organic material vulnerable to high temperature. For example, the touch buffer film T-BUF may be formed of an acrylic-based or siloxane-based material. As the touch display device 100 is bent, the encapsulation layer ENCAP may be damaged, and the touch sensor metal positioned on the touch buffer layer T-BUF may be broken. Even when the touch display device 100 is bent, the touch buffer layer T-BUF formed of an organic insulating material and having planarization capability may prevent damage to the encapsulation layer ENCAP and/or breakage of the metals TSM and BRG constituting the touch sensor TS.

Referring to FIG. 3, a protection layer PAC may be disposed as covering the touch sensor TS. The protection layer PAC may be an organic insulation film. Such an organic insulation film may be the same material as the above-described planarization layer PLN, for example. The organic insulation film may be formed of a material different from that of the second encapsulation layer PCL2. For example, the protection layer PAC may include a thermosetting resin.

Figure 4:
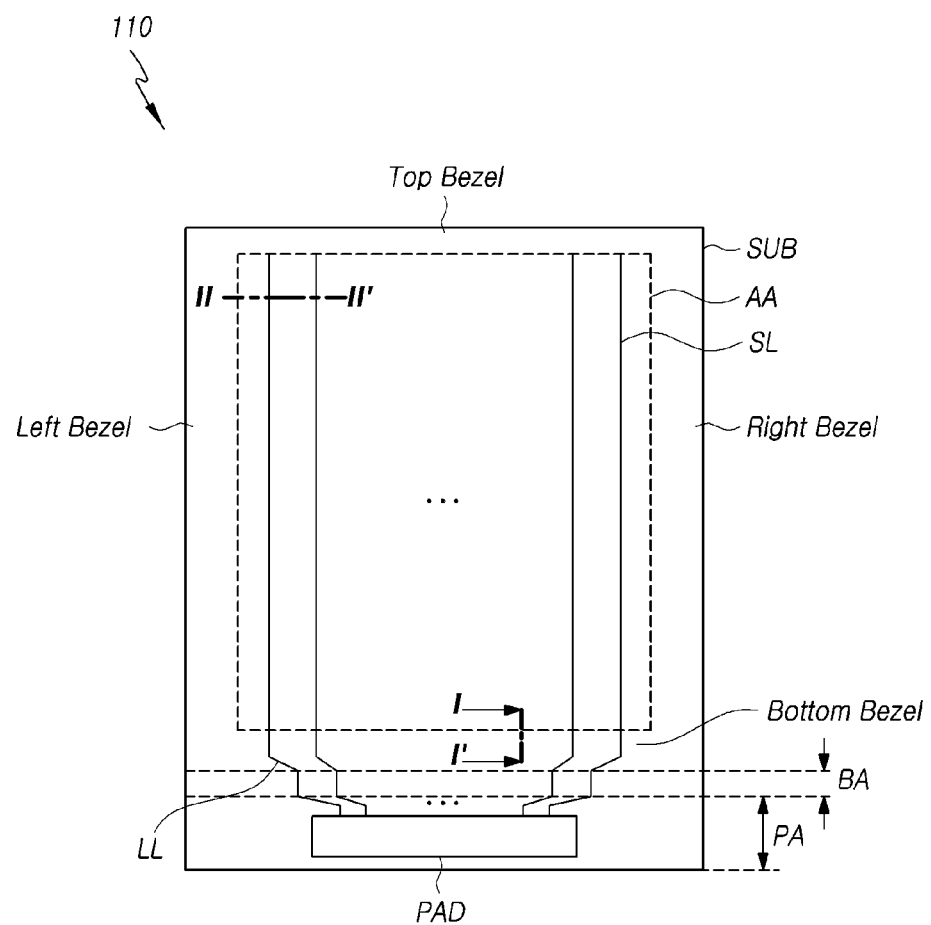
FIG. 4 is a view illustrating a display area, a bending area, and a pad area in a display panel according to the present disclosure.

FIG. 4 is a view illustrating a display area AA, a bending area BA, and a pad area PA in the display panel 110 according to aspects of the disclosure.

Referring to FIG. 4, the display panel 110 according to aspects of the disclosure may include a display area AA and a non-display area around the display area AA.

The non-display area may include a bezel area, a bending area BA, and a pad area PA.

A plurality of subpixels for displaying an image are positioned in the display area AA. One or more signal lines SL are disposed in the display area AA.

The signal lines SL may include data lines for supplying data signals to the subpixels and gate lines for supplying gate signals to the subpixels.

The signal line SL shown in FIG. 4 may include a touch sensor embedded in the display panel 110. For example, a touch driving signal output from a touch driving circuit may be input to the signal line SL.

The signal line SL is assumed below to be a data line for supplying a data signal to the subpixel, but is not limited thereto.

Referring to FIG. 4, the bezel area is positioned around the display area AA. For example, a top bezel may be positioned above the display area AA, a left bezel may be positioned on the left side of the display area AA, a right bezel may be positioned on the right side of the display area AA, and a bottom bezel may be positioned below the display area AA.

In the bezel area, the gate driving circuit may be disposed in a gate-in-panel (GIP) type, or the gate driving circuit may be disposed in a chip-on-glass (COG) type or a chip-on-film (COF) type.

In the bezel area, the data driving circuit may be connected to the display panel 110 in a tape automated bonding (TAB) manner. Alternatively, in the pad portion PAD of the non-display area, the data driving circuit may be connected to the display panel 110 in a chip-on-glass (COG) manner or a chip-on-panel (COP) manner. Alternatively, the data driving circuit may be implemented in a chip-on film (COF) fashion and be connected to the display panel 110 in the bezel area.

In FIG. 4, the bending area BA and the pad area PA are shown as distinguished from the bottom bezel. However, the bending area BA and the pad area PA may be included in the bottom bezel. In the disclosure, for convenience of description, the bottom bezel and the bending area BA are described as distinguished from each other, but the touch display device according to aspects of the disclosure is not limited thereto.

Referring to FIG. 4, the bending area BA and the pad area PA may be positioned under the bottom bezel.

The substrate constituting the display panel 110 may be bent in the bending area BA, and the pad area PA is positioned on the rear surface of the display area AA.

A plurality of link lines LL for electrically connecting the pad portion PAD and the signal line SL are disposed in the bending area BA.

In the bending area BA, the plurality of link lines LL are disposed in a direction perpendicular to the bending axis. The plurality of link lines LL may be disposed on at least one of the upper and lower sides of the bending area BA in an oblique direction inclined from the vertical direction.

The pad portion PAD may include at least one fin for transferring the signal input from the outside to the signal line SL or for transferring the signal input from the signal line SL to the outside.

For example, if the signal line SL is a data line, the pad portion PAD is connected to the data driving circuit, and the pad portion is electrically connected to the data lines of the display area AA through the plurality of link lines LL.

When the data driving circuit is positioned in a chip-on panel (COP) manner, the data driving circuit may be positioned on the pad portion PAD.

Figure 5:
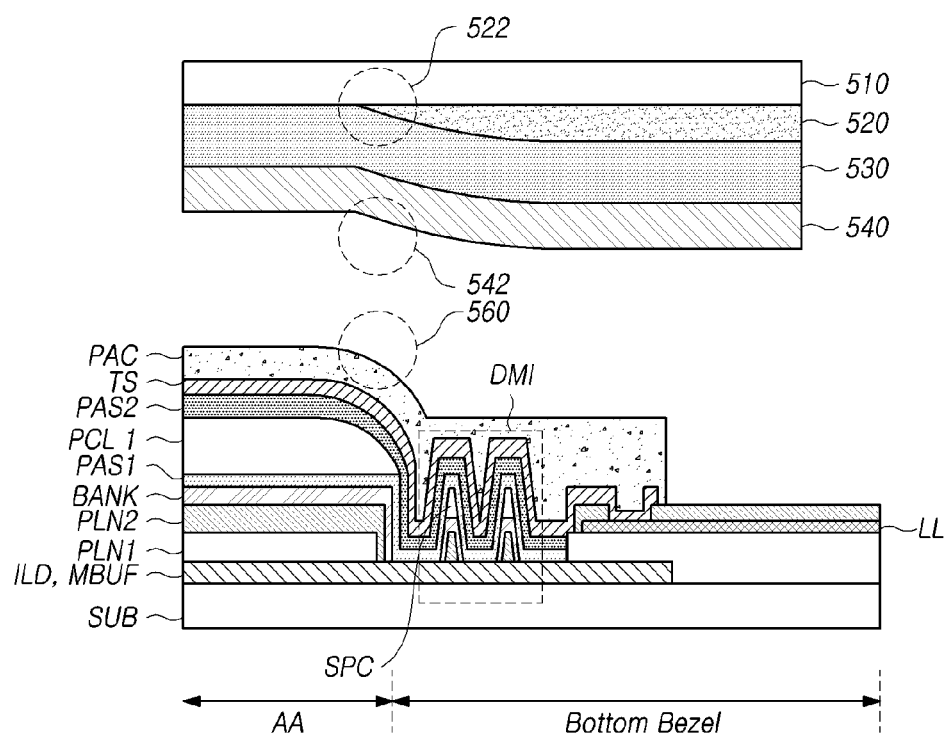
FIG. 5 is a cross-sectional view taken along line I-I' of FIG. 4 in a touch display device according to the present disclosure.

FIG. 5 is a cross-sectional view taken along line I-I' of FIG. 4 in a touch display device 100 according to aspects of the disclosure.

Referring to FIG. 5, the inorganic insulation film layers, such as the multi-buffer layer MBUF and the inter-layer insulation film ILD, on the substrate SUB are simply shown as a single layer. The layer may further include the above-described active buffer layer ABUF.

The inorganic insulation film layer is positioned on at least a portion of the bottom bezel. The inorganic insulation film layer may not overlap with the bending area BA. Due to the characteristics of the inorganic insulation film layer, if positioned to overlap with the bending area BA, the inorganic insulation film layer may be stressed, causing microcracks. Accordingly, moisture may be introduced into the inorganic insulation film layer and may permeate up to the display area AA. Resultantly, display quality may deteriorate in the display area AA. Thus, the inorganic insulation film layer may be disposed not to overlap with the bending area BA.

An inner dam DMI may be positioned in the bottom bezel area. The inner dam DMI may include one or more dam structures.

The dam structure constituting the inner dam DMI may have, e.g., a triple-layer structure including a planarization layer PLN, a bank BANK, and a spacer SPC.

The inner dam DMI may be configured to prevent the first encapsulation layer PCL1 positioned in the display area AA from overflowing to the bending area BA.

Referring to FIG. 5, the first passivation layer PAS1 and the second passivation layer PAS2 may extend from the display area AA and may be positioned on the dam structure of the inner dam DMI.

On the second passivation layer PAS2, the touch sensor TS extends from the display area AA to an area beyond the inner dam DMI. The touch sensor TS may be connected to the link line LL through a contact hole. The contact hole positioned in the area where the touch sensor TS and the link line LL are connected may be a contact hole formed in the second planarization layer PLN2.

A protection layer PAC may be positioned on the touch sensor TS, and the protection layer PAC may be positioned in at least a partial area of the display area AA and the bezel area.

Referring back to FIG. 5, the protection layer PAC positioned on the first encapsulation layer PCL1 has a step which extending from the display area AA to the bottom bezel. The step may occur because the thick first encapsulation layer PCL1 positioned under the protection layer PAC is not disposed beyond the inner dam DMI.

Accordingly, the protection layer PAC may have an inclined surface 560 in the display area AA adjacent to the bezel area (e.g., bottom bezel).

Referring to FIG. 5, a cover glass 510 may be positioned on the front surface of the touch display device. A light blocking layer 520 surrounding the display area AA is positioned on the rear surface of the cover glass 510.

The light blocking layer 520 can prevent the light generated from the edge of the display area AA from leaking toward the bezel. Accordingly, the light blocking layer 520 may be disposed on the rear surface of the cover glass 510 along the edge of the display area AA. Such a light blocking layer 520 is also referred to as a cover glass black matrix. An end of the light blocking layer 520 may be aligned with, or positioned inside, the edges of the cover glass 510.

A polarizing plate 540 may be further disposed on the rear surface of the cover glass 510. The polarizing plate 540 may be attached to the cover glass 510 by a transparent adhesive layer 530. The polarizing plate 540 may be provided for the purpose of increasing visibility of the touch display device.

For example, various patterns and various metal patterns disposed to form a transistor on the substrate SUB may reflect the light incident from the outside. Accordingly, the light incident from the outside of the touch display device may be reflected to be perceived by the user using the touch display device. Therefore, the visibility of the touch display device may be deteriorated.

The touch display device according to aspects of the disclosure may further include the polarizing plate 540 for blocking the reflected light of the light incident from the outside.

The polarizing plate 540 may be disposed not only on the display area AA but also on at least a portion of the non-display area including the bezel area. Accordingly, at least a portion of the polarizing plate 540 may be disposed to overlap with the light blocking layer 520.

Accordingly, the polarizing plate 540 may include an inclined surface 542 positioned in an area corresponding to the inclined surface 522 of the light blocking layer 520.

In some cases, the inclined surface 542 of the polarizing plate 540 may be positioned in an area overlapping with the inclined surface 560 of the protection layer PAC. In this case, the inclined surface 542 of the polarizing plate 540 may be disposed over the inclined surface 560 of the protection layer PAC so that the inclined surface 542 of the polarizing plate 540 may have a larger inclination angle.

This may result in deterioration of display quality near the edge of the display area AA.

This issue occurs even when a transparent adhesive layer 530 is further disposed on the rear surface of the polarizing plate 540.

Figure 6:
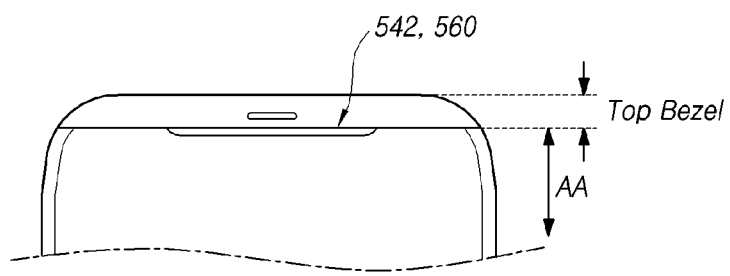
FIG. 6 is a view illustrating an appearance display defect (e.g., waviness) in a touch display device.

FIG. 6 is a view illustrating an appearance display a waviness defect in a touch display device.

Referring to FIG. 6, when the inclined surface 542 of the polarizing plate and the inclined surface 560 of the protection layer are positioned in an overlapping area, a defect may be recognized by the user along the inclined surface 542 of the polarizing plate.

For example, when the display panel has a notch as shown in FIG. 6, a wavy band-shaped pattern may be perceived by the user due to a bending or sinking to the rear surface of the polarizing plate at the boundary between the display area AA and the non-display area (e.g., top bezel area). Such an appearance defect is also referred to as a waviness defect.

Therefore, a need exists for a method for mitigating the waviness defect caused by the bending of the polarizing plate.

Figure 7:
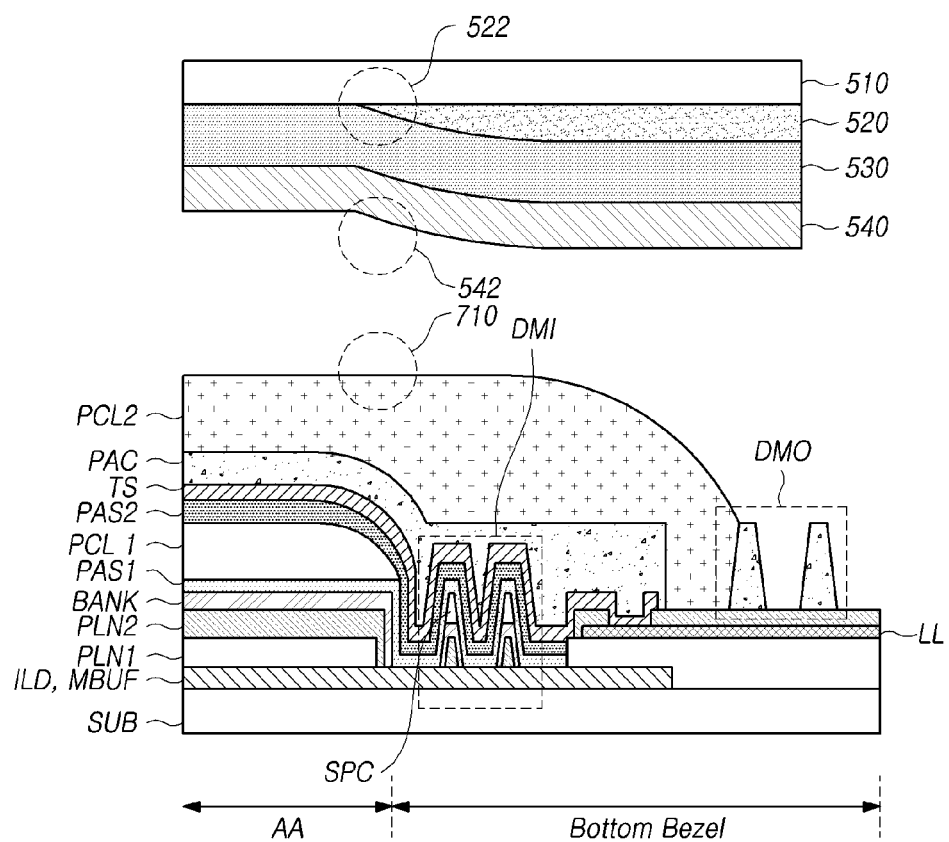
FIG. 7 is a cross-sectional view taken along line I-I' of FIG. 4 in a touch display device according to the present disclosure.

FIG. 7 is a cross-sectional view taken along line I-I' of FIG. 4 in a touch display device according to aspects of the disclosure.

Referring to FIG. 7, the touch display device according to aspects of the disclosure further includes a second encapsulation layer PCL2 positioned on the touch sensor TS.

The second encapsulation layer PCL2 may be positioned on the protection layer PAC in the display area AA and at least a partial area of the bottom bezel.

The touch display device according to aspects of the disclosure may include an outer dam DMO configured to prevent the second encapsulation layer PCL2 from overflowing.

The outer dam DMO includes one or more dam structures.

The outer dam DMO may be positioned in an area overlapping with the light blocking layer 520. One or more dam structures may be positioned outside the inclined surface 522 of the light blocking layer 520.

The outer dam DMO may be positioned in an area overlapping with the polarizing plate 540. One or more dam structures may be positioned outside the inclined surface 542 of the polarizing plate 540.

Each of one or more dam structures constituting the outer dam DMO may be a single-layer structure or a structure including two or more layers.

For example, referring to FIG. 6, the dam structure may be a single-layer structure formed of a protection layer PAC. Alternatively, the dam structure may be formed of a spacer SPC only. Alternatively, the dam structure may be formed of a single layer of an organic insulation film layer.

The dam structure may have a structure of two or more layers. For example, like the structure of the inner dam DMI, the dam structure may have a double-layer structure of a bank BANK and a spacer SPC or a double layer structure of a spacer SPC and a protection layer PAC. Alternatively, the dam structure may include a triple-layer structure of a bank, a spacer SPC, and a protection layer PAC.

When the outer dam DMO includes two or more dam structures, one of the two or more dam structures may be a single-layer dam structure, and the other may be a dam structure having two or more layers.

The outer dam DMO may include a dam structure formed by stacking at least one insulation film on at least a partial area of the non-display area. For example, as shown in FIG. 7, the outer dam DMO may include a dam structure formed by stacking a protection layer PAC.

As another example, the outer dam DMO may include a dam structure formed by removing the insulation film stacked on at least a partial area of the non-display area by etching. Accordingly, the insulation film that is not removed may function as a dam structure by confining at least a portion of the second encapsulation layer PCL2 in the insulation film-removed area.

As described above, the second encapsulation layer (PCL2) may be prevented from overflowing by a peak formed by stacking the insulation layer or a valley formed by removing the insulation layer.

Referring to FIG. 6, the outer dam DMO may be positioned inside the bending area BA. Accordingly, it is possible to prevent the second encapsulation layer PCL2 from being positioned up to the above-described pad portion PAD.

The second encapsulation layer PCL2 may be disposed to cover the entire display area AA. The second encapsulation layer PCL2 may be disposed on at least a partial area of the bezel area.

The second encapsulation layer PCL2 may be an acrylic resin, an epoxy resin, polyimide, polyethylene, or silicon oxycarbide (SiOC) and be formed of an organic insulating material. For example, the second encapsulation layer PCL2 may be formed through inkjet printing.

The second encapsulation layer PCL2 may be formed by ultraviolet curing. In this case, the second encapsulation layer PCL2 may include a photoinitiator that initiates a polymerization reaction by receiving ultraviolet light.

The thickness of the second encapsulation layer PCL2 is larger than the thickness of the protection layer PAC positioned on the touch sensor TS. For example, the second encapsulation layer PCL2 may be required to have a thickness sufficient to alleviate a bending of the inclined surface 542 of the polarizing plate 540 in the bezel area. The thickness may be about 14 μm or more. Accordingly, in the area overlapping with the inclined surface 542 of the polarizing plate 540, the second encapsulation layer PCL2 may compensate for the step of the protection layer PAC and planarize the area on the protection layer PAC. Accordingly, the polarizing plate 540 is disposed on the area 710 planarized by the second encapsulation layer PCL2.

Accordingly, the bending issue with the polarizing plate 540 is alleviated, significantly mitigating above-described waviness defects.

Figure 8:
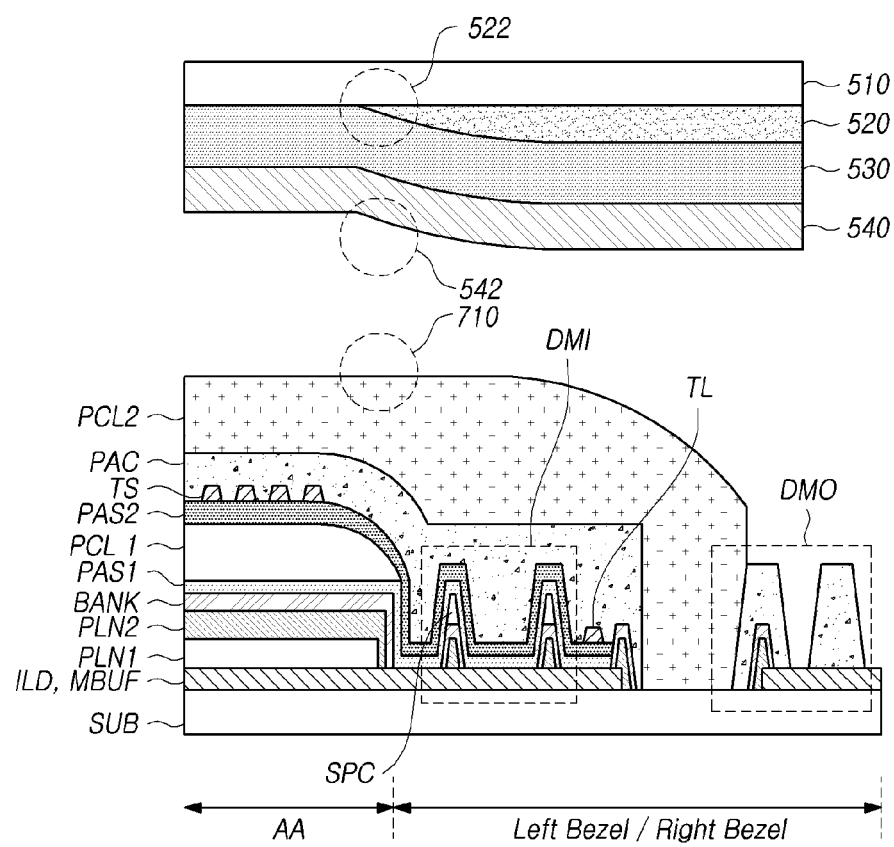
FIG. 8 is a cross-sectional view taken along line II-II' of FIG. 4 in a touch display device according to the present disclosure.

FIG. 8 is a cross-sectional view taken along line II-II' of FIG. 4 in a touch display device according to aspects of the disclosure.

Referring to FIG. 8, the touch display device according to aspects of the disclosure may include an outer dam DMO positioned in a left bezel and/or a right bezel area.

Referring to FIG. 8, an inner dam DMI configured to prevent overflow of the second encapsulation layer PCL2 is also positioned in the left bezel and/or right bezel area. For the same reason as described above, sinking may also occur in the left bezel and right bezel areas due to the inclined surface 542 of the polarizing plate 540, causing a waviness defect.

The touch display device according to aspects of the disclosure may further include an outer dam DMO positioned in the left bezel area and/or right bezel area. The outer dam DMO may include one or more dam structures.

The outer dam DMO may prevent the planarization layer PCL2 from reaching the left end and/or right end of the substrate SUB2 beyond the outer dam DMO.

Referring to FIG. 8, a touch line TL electrically connected to the touch sensor TS may be disposed between the inner dam DMI and the outer dam DMO. In other words, the outer dam DMO may be disposed outside the touch line TL.

The outer dam DMO may include two or more dam structures. Each of the two or more dam structures may be formed of a single layer, or may be formed as a structure of two or more layers.

For example, referring to FIG. 8, any one of the two or more dam structures may have a triple-layer structure including a planarization layer PLN, a bank BANK, and a protection layer PAC. Another dam structure among the two or more dam structures may have a single-layer structure including a protection layer PAC.

Any one of the one or more dam structures included in the outer dam DMO may touch the substrate SUB in the area where the multi-buffer layer MBUF, the inter-layer insulation film ILD, or the like has been removed on the substrate SUB. In the area where the multi-buffer layer MBUF has been removed on the substrate SUB, the planarization layer PCL2 may contact the substrate SUB.

Accordingly, in the touch display device according to aspects of the disclosure, waviness defects that may occur in the edge area of the display area AA may be mitigated.

Figure 9:
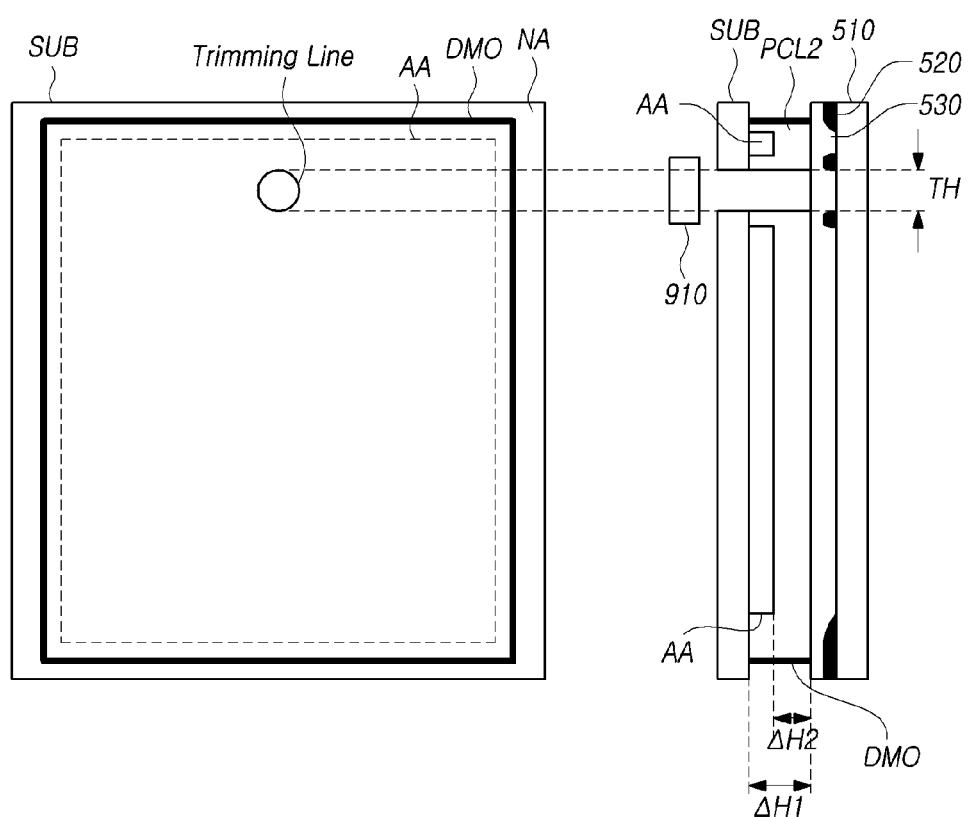
FIG. 9 is a view schematically illustrating a touch display device further including an optical electronic device.

FIG. 9 is a view schematically illustrating a touch display device further including an optical electronic device 910.

Referring to FIG. 9, the touch display device according to aspects of the disclosure may further include an optical electronic device 910. The optical electronic device 910 is a device that requires light reception. For example, the optical electronic device 910 may be a camera, or a detection sensor, such as a proximity sensor or an illuminance sensor.

The optical electronic device 910 may be positioned in an area under the substrate SUB of the display panel. The optical electronic device 910 may receive light through, e.g., a through-hole TH formed by removing at least a portion of the substrate SUB. Since the subpixel cannot be positioned in the area where at least a portion of the substrate SUB has been removed, the area inside the through-hole TH may be a non-display area.

The structure in which the through-hole TH is positioned inside the display area AA and overlaps with the optical electronic device 910 under the through-hole TH is also referred to as a hole in active area (HiAA) structure.

Accordingly, the light blocking layer 520 is positioned around the through-hole TH. Therefore, the above-described waviness defect may occur even around the light blocking layer.

To prevent such defects, a second encapsulation layer PCL2 is disposed on the substrate SUB.

After the second encapsulation layer PCL2 is disposed on the substrate SUB, a portion of the substrate SUB is removed along a trimming line, forming the through-hole TH. Accordingly, the second encapsulation layer PCL2 is removed on the through-hole TH. Accordingly, the outer dam DMO may be positioned around the through-hole TH, but even when the outer dam DMO is not positioned, the second encapsulation layer PCL2 may be prevented from invading up to the through-hole TH.

However, the second encapsulation layer PCL2 is positioned in the surrounding area of the through-hole TH. Specifically, the second encapsulation layer PCL2 may be positioned in an area between the trimming line and the display area AA.

In the area, the thickness of the second encapsulation layer PCL2 may be increased.

For example, if the thickness ΔH2 of the second encapsulation layer PCL2 on the display area AA is about 14 μm, the thickness ΔH1 of the second encapsulation layer PCL2 in the surrounding area of the through-hole TH may be increased by about 10 μm. In other words, the thickness ΔH1 of the second encapsulation layer PCL2 in the corresponding area may reach about 24 μm.

Accordingly, the touch display device according to aspects of the disclosure may effectively mitigate appearance defects, such as waviness defects, at the boundary between the display area AA and the non-display area (e.g., the bezel areas, and inside the through-hole).

The foregoing aspects of the disclosure are briefly described below.

Various aspects of the disclosure may provide a touch display device 100 comprising a substrate SUB, a subpixel SP including a transistor positioned on the substrate SUB and a light emitting element ED electrically connected with the transistor, an encapsulation layer ENCAP positioned to cover the light emitting element ED, a touch sensor TS positioned on the encapsulation layer ENCAP, a second encapsulation layer PCL2 positioned on the touch sensor TS, and at least one dam structure configured to prevent overflow of the second encapsulation layer PCL2.

Various aspects of the present disclosure may provide the touch display device 100, wherein the substrate SUB have, thereon, a display area AA where the subpixel SP is positioned, and a non-display area NA where a pad portion PAD is disposed around the display area AA, wherein the at least one dam structure is positioned in the non-display area NA and in an area between the display area AA and the pad portion PAD.

Various aspects of the present disclosure may provide the touch display device 100 further comprising a cover glass 510 positioned on a front surface of the substrate SUB, a light blocking layer 520 positioned on a rear surface of the cover glass 510 and including an inclined surface 522, and a polarizing plate 540 including an inclined surface 542 positioned in an area overlapping with the inclined surface of the light blocking layer 520, wherein the at least one dam structure is positioned outside the inclined surface 542 of the polarizing plate 540.

Various aspects of the present disclosure may provide the touch display device 100, wherein the non-display area NA includes a pad area PA where the pad portion PAD is positioned and a bending area BA between the display area AA and the pad area PA, and wherein the at least one dam structure is positioned in an area (e.g., bottom bezel area) between the display area AA and the bending area BA.

Various aspects of the present disclosure may provide the touch display device 100 further comprising two or more dam structures configured to prevent overflow of the second encapsulation layer PCL2, wherein any one of the two or more dam structures is a single-layer (e.g., protection layer PAC) dam structure, and another one thereof is a dam structure having two or more layers (e.g., bank BANK and protection layer PAC).

Various aspects of the present disclosure may provide the touch display device 100, wherein the second encapsulation layer PCL2 includes a photoinitiator, and wherein the photoinitiator is a material to initiate a polymerization reaction by receiving ultraviolet light.

Various aspects of the disclosure may provide the touch display device 100, further comprising a protection layer PAC positioned between the touch sensor TS and the planarization layer PCL2.

Various aspects of the disclosure may provide the touch display device 100, wherein the at least one dam structure includes the protection layer PAC.

Various aspects of the present disclosure may provide the touch display device 100, wherein the transistor includes an active layer ACT and a source-drain electrode material SD1 electrically connected to the active layer ACT, wherein the light emitting element ED includes a light emitting layer EL, wherein at least one organic insulation film layer (e.g., PLN) is positioned between the source-drain electrode material SD1 of the transistor and the light emitting layer EL of the light emitting element ED, and wherein the at least one dam structure includes the organic insulation film layer.

Various aspects of the present disclosure may provide the touch display device 100 further comprising at least one inorganic insulation film layer (e.g., MBUF, ABUF, GI, or ILD) positioned on the substrate SUB, wherein the inorganic insulation film layer is removed from at least a partial area on the substrate SUB, and wherein the at least one dam structure is positioned to overlap with the inorganic insulation film layer-removed area and contacts the substrate SUB.

Various aspects of the present disclosure may provide the touch display device 100, wherein the second encapsulation layer PCL2 has a thickness of 14 µm or more.

Various aspects of the disclosure may provide the touch display device 100 further comprising a through-hole TH formed by removing at least a portion of the substrate SUB and an optical electronic device 910 positioned to at least partially overlap with the through-hole TH, wherein a thickness ΔH1 of the second encapsulation layer PCL2 around the through-hole TH is larger than a thickness ΔH2 of the second encapsulation layer PCL2 on the subpixel SP.

Various aspects of the disclosure may provide the touch display device 100, wherein the planarization layer PCL2 is formed in an area on the touch sensor TS by inkjet printing.

The above description has been presented to enable any person skilled in the art to make and use the technical idea of the disclosure, and has been provided in the context of a particular application and its requirements. Various modifications, additions and substitutions to the described aspects will be readily apparent to those skilled in the art, and the general principles defined herein may be applied to other aspects and applications without departing from the spirit and scope of the disclosure. The above description and the accompanying drawings provide an example of the technical idea of the disclosure for illustrative purposes only. That is, the disclosed aspects are intended to illustrate the scope of the technical idea of the disclosure. Thus, the scope of the disclosure is not limited to the aspects shown, but is to be accorded the widest scope consistent with the claims. The scope of protection of the disclosure should be construed based on the following claims, and all technical ideas within the scope of equivalents thereof should be construed as being included within the scope of the present disclosure.

What is claimed is:

1. A touch display device, comprising:
    a substrate including a display area and a non-display area disposed outside the display area;
    a subpixel including a transistor positioned on the substrate and a light emitting element electrically connected with the transistor;
    an encapsulation layer covering the light emitting element;
    a touch sensor disposed on the encapsulation layer;
    a planarization layer disposed on the touch sensor; and
    at least one dam structure configured to prevent an uncured portion of the planarization layer from overflowing,
    wherein the planarization layer is in direct contact with the at least one dam structure.

2. The touch display device of claim 1, further comprising a pad portion disposed in the non-display area,
    wherein the at least one dam structure is positioned in the non-display area and between the display area and the pad portion.

3. The touch display device of claim 2, further comprising:
    a cover glass disposed on a front surface of the substrate;
    a light blocking layer including an inclined surface and disposed on a rear surface of the cover glass; and
    a polarizing plate including an inclined surface overlapping with the inclined surface of the light blocking layer,
    wherein the at least one dam structure is disposed outside the inclined surface of the polarizing plate.

4. The touch display device of claim 2, wherein the non-display area includes:
    a pad area where the pad portion is disposed; and a bending area disposed between the display area and the pad area, and wherein the at least one dam structure is disposed between the display area and the bending area.

5. The touch display device of claim 1, wherein the at least one dam structure includes two dam structures having a first dam of a single-layer and a second dam of two or more layers.

6. The touch display device of claim 1, wherein the planarization layer includes a photoinitiator initiating a polymerization reaction by receiving ultraviolet light.

7. The touch display device of claim 1, further comprising a protection layer disposed between the touch sensor and the planarization layer.

8. The touch display device of claim 7, wherein the at least one dam structure includes the protection layer.

9. The touch display device of claim 1, wherein the transistor includes an active layer and a source-drain electrode electrically connected to the active layer, wherein the light emitting element includes a light emitting layer, wherein at least one organic insulation film layer is disposed between the source-drain electrode of the transistor and the light emitting layer of the light emitting element, and wherein the at least one dam structure includes the at least one organic insulation film layer.

10. The touch display device of claim 1, further comprising at least one inorganic insulation film layer disposed on the substrate, wherein the at least one inorganic insulation film layer has a portion removed from the substrate, and wherein the at least one dam structure is positioned to overlap with the removed portion of inorganic insulation film layer and contacts the substrate.

11. The touch display device of claim 1, wherein the planarization layer has a thickness of 14 µm or more.

12. The touch display device of claim 1, further comprising:

a through-hole formed by removing a portion of the substrate; and an optical electronic device positioned to partially overlap with the through-hole, wherein a thickness of the planarization layer around the through-hole is larger than a thickness of the planarization layer on the subpixel.

13. The touch display device of claim 1, wherein the planarization layer is formed in an area on the touch sensor by inkjet printing.

14. A touch display device, comprising:

a substrate including a display area and a non-display area having a bezel area, a bending area and a pad area that are disposed outside the display area;

a subpixel disposed on the substrate;

a planarization layer disposed on the subpixel;

a touch sensor disposed on the planarization layer;

an encapsulation layer disposed on the touch sensor; and a first dam structure disposed in the non-display area in a close proximity to the display area where the planarization layer is not disposed under the first dam structure, wherein the encapsulation layer is in direct contact with the first dam structure.

15. The touch display device of claim 14, wherein the first dam structure is disposed in the bezel area.

16. The touch display device of claim 14, further comprising a second dam structure spaced apart from the first dam structure and disposed inside the bending area.

17. The touch display device of claim 14, further comprising:

a cover glass disposed on a front surface of the substrate;

a light blocking layer including an inclined surface and disposed on a rear surface of the cover glass; and a polarizing plate including an inclined surface overlapping with the inclined surface of the light blocking layer, wherein the first dam structure is disposed outside the inclined surface of the polarizing plate.

18. The touch display device of claim 14, further comprising:

a through-hole position in an area where a portion of the substrate is removed; and an optical electronic device positioned to partially overlap with the through-hole, wherein a thickness of the encapsulation layer around the through-hole is greater than a thickness of the encapsulation layer on the subpixel.

19. The touch display device of claim 14, wherein the encapsulation layer is formed on the touch sensor by inkjet printing.

20. The touch display device of claim 14, further comprising a protection layer disposed between the touch sensor and the encapsulation layer.

* * * * *